Nov. 6, 1934.  W. B. MATHEWS  1,979,806
BLIND GASKET
Filed Dec. 29, 1932
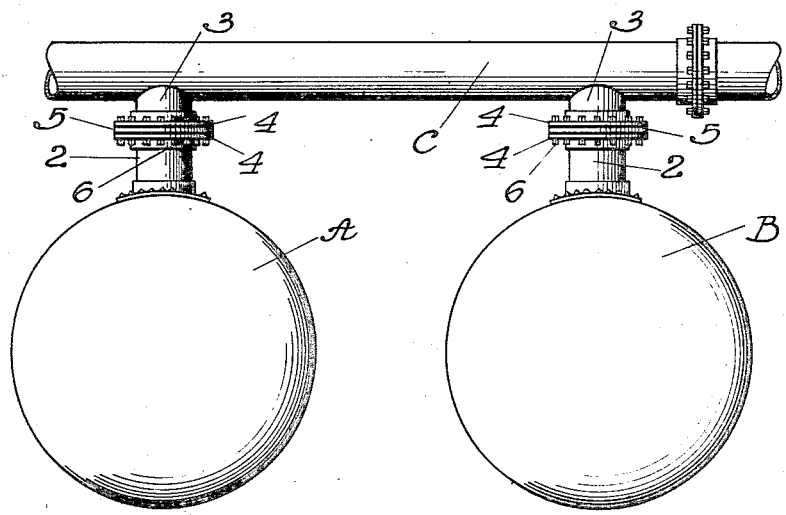
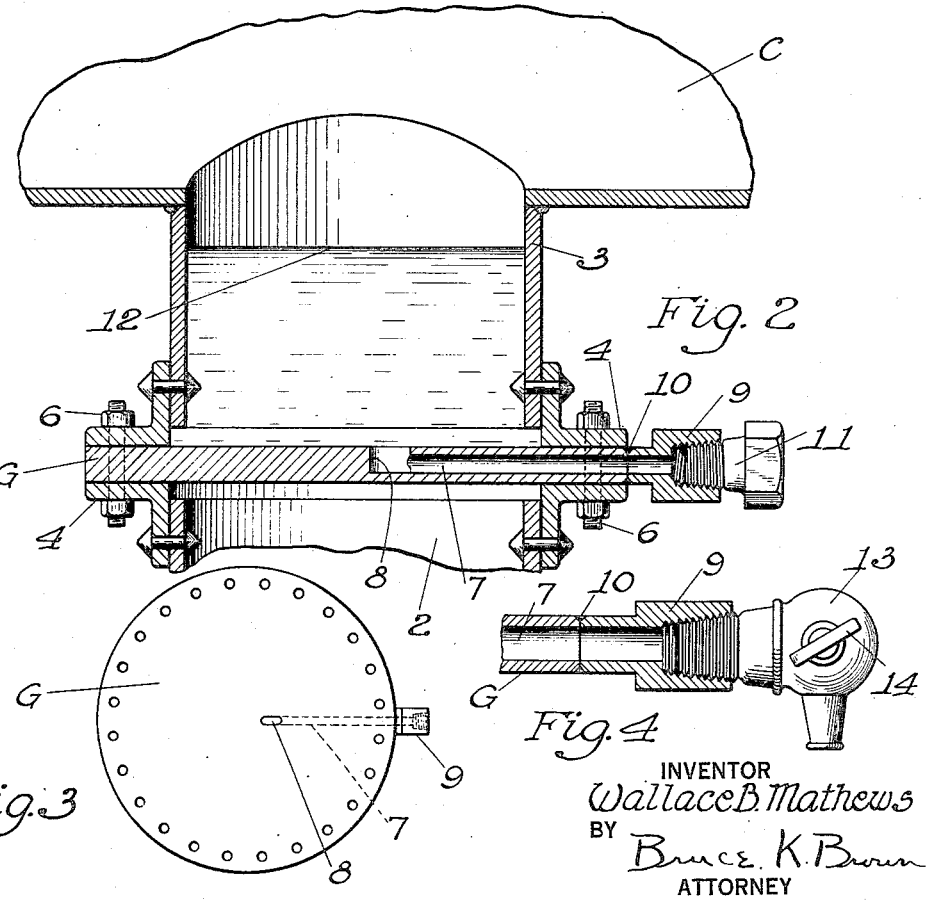
INVENTOR
Wallace B. Mathews
BY Bruce K. Brown
ATTORNEY Patented Nov. 6, 1934

1,979,806

UNITED STATES PATENT OFFICE 1,979,806

BLIND GASKET

Wallace B. Mathews, Chicago, Ill., assignor to Standard Oil Company, Chicago, Ill., a corporation of Indiana Application December 29, 1932, Serial No. 649,415

3 Claims. (Cl. 137—76)

My invention relates to improvement in blind gaskets for blocking fluid and vapor flow lines.

It has been the practice in the oil refinery and other kindred arts to establish vapor or fluid communication between a group of stills or other fluid treating apparatus and a common overhead flow pipe by vertical or inclined flanged pipe sections, one of which was secured to the flow pipe and the other to the fluid treating apparatus and in inserting a blind gasket between the adjacent sections when it was decided to block off any one of the stills or apparatus, as for repair or "shut down". This procedure, particularly in such cases as where inflammable or corrosive fluids and vapors are to be conducted through the system, necessitates some means for draining off fluid or distillate which may accumulate in the upper of the pipe sections, above the blind gasket, prior to removal of the gasket to reestablish flow. Drain cocks have been employed for this purpose, located directly above the blind gasket, but their ineffectiveness in not completely draining the vertical pipe sections has resulted merely in reducing, rather than eliminating, the hazard of fire or injury to the operator at such time as when the gasket is removed.

An object of my invention is to provide a blind gasket for blocking off vertical or inclined pipe sections, incorporating means for draining off all of the distillate or other fluids which may accumulate in the pipe sections above the gasket prior to its removal.

Another object is to provide fluid drain means, as described, which may be embodied in any type of blind gasket now in use having a sufficient thickness to permit a lateral bore through the side walls thereof.

Other objects, the advantages and uses of the invention, will become apparent after reading the following description and claims, and after consideration of the accompanying drawing forming a part of this specification, in which Figure 1 is an elevation illustrating refinery apparatus prior to installation of the blind gasket.

Figure 2 is a sectional view illustrating a blind gasket constructed in accordance with my invention installed between the vertical pipe sections of the apparatus of Figure 1;

Figure 3 is a top plan view of the blind gasket, and

Figure 4 is a fragmentary sectional view illustrating a modified form of the drain element.

The apparatus of Figure 1 represents a typical group installation of stills such as employed in oil refineries. Two of the stills A and B of the group are illustrated, both of which communicate with an overhead flow pipe C, through the medium of vertical pipe sections 2 and 3 fixed to the stills and to the flow pipe C respectively. The pipe sections 2 and 3 are connected with one another by laterally extending flanges 4 between which a ring gasket 5 is normally compressed by the tightening of a plurality of stud bolts 6 extending through the flanges and gasket. Vapors of distillation from each of the stills A and B are therefore free to travel through the pipe sections 2 and 3 into the common flow pipe C where they may be conducted to condensers or other suitable treating apparatus, not shown.

It is frequently necessary to shut down one or a plurality of the group of stills connected with the flow pipe C, such as for repair, scavenging, etc., and for this purpose a blind gasket is substituted for the ring gasket 5 thereby blocking off the apparatus from the balance of the system.

My improved blind gasket comprises a circular steel plate illustrated at G, in Figures 2 and 3, and is preferably about three quarters of an inch in thickness. The gasket is further formed with a bore 7 extending radially inward from the side walls thereof, terminating at its innermost end in an elongated recess 8 communicating with the upper face of the gasket. An internally threaded nipple 9 is welded at 10 to the outer side wall of the gasket G with the bore thereof in registration with the gasket bore 7. A screw plug 11 may be inserted within the threaded portion of the nipple 9 to close the mouth of the drain passageway thus provided.

The application of my improved blind gasket to the vertical pipe sections 2 and 3 during the blocking off of one of the stills A or B may be carried out precisely as is the practice in connection with a plain circular blind gasket. Under normal conditions during that time which the still is shut down or inoperative through the blocking of the pipe sections 2 and 3 distillate and other fluids present in the flow pipe C may accumulate above the gasket in the pipe section 3 as illustrated in Figure 2. In such instances as where the apparatus is employed for fuel cracking the distillate and fluids may be highly inflammable, thereby exposing both property and operator to the hazard of injury through fire by the spilling out of the accumulated fluids at such times as when a blind gasket of the ordinary type is removed. With my improved gasket this hazard is entirely eliminated through the complete drainage of the accumulated fluid 12 through the bore 7 into a suitable receptacle, upon the removal of the screw plug 11. This operation may be performed prior to the unfastening of the stud bolts 6.

In Figure 4 I have shown the blind gasket as equipped with a drain cock 13 in place of the screw plug 11 thereby permitting the pipe section to be drained by turning the valve stem 14 to its open position.

It is to be understood that the above described embodiment of the invention is for the purpose of illustration only and that various changes may be made therein without departing from the spirit and scope of the claims.

I claim:

1. A blind gasket adapted to be interposed between flanged pipe sections comprising a flat circular body formed with a passageway extending inwardly from its side wall and terminating at its inner end in a laterally extending portion communicating with one of the faces of said gasket.

2. A blind gasket adapted to be interposed between flanged pipe sections comprising a flat circular body formed with a passageway extending inwardly from its side wall and terminating at its inner end in a laterally extending portion communicating with one of the faces of said gasket, and manually operable means for closing and opening the mouth of said passageway.

3. In combination, a pair of aligned substantially upright pipe sections, and a blind gasket removably interposed between said sections, said gasket comprising a flat circular body formed with a passageway extending inwardly from its side wall and terminating at its inner end in a laterally and upwardly extending portion communicating with the upper of the faces of said gasket.

WALLACE B. MATHEWS.